United States Patent [19]
Thorpe et al.

[11] Patent Number: 5,567,220
[45] Date of Patent: Oct. 22, 1996

[54] COMBINATION PLANT FOOD SUPPLEMENT AND COMPOST MATERIAL AND PROCESS

[76] Inventors: James W. Thorpe; Dennis E. Thorpe, both of 89518 Poodle Creek Rd., Noti, Oreg. 97461

[21] Appl. No.: 406,528

[22] Filed: Mar. 20, 1995

[51] Int. Cl.$^6$ .................................. C05F 9/04; C05F 1/00
[52] U.S. Cl. ........................... 71/9; 71/16; 71/23; 71/24
[58] Field of Search ................................... 71/23, 24, 16, 71/9, 10

[56] References Cited

U.S. PATENT DOCUMENTS

| | | | |
|---|---|---|---|
| 4,927,455 | 5/1990 | Hotta et al. | 71/64.13 |
| 5,413,618 | 5/1995 | Penningsfeld et al. | 71/24 |

*Primary Examiner*—Ferris Lander
*Attorney, Agent, or Firm*—Eugene M. Eckelman

[57] ABSTRACT

A carbonaceous material and a nitrogenous material are mixed in combination with activated carbon ash and perlite fines. The activated carbon and perlite fines serve to limit the loss of ammonia nitrates as well as to lock nitrogen in the biomass and to limit fly larva and odors. The nitrogenous material comprises fish scrap and the carbonaceous material may include wood sawdust, wood pulp or agricultural by-products. All of the ingredients of the product may comprise industrial waste products. The process is conducive to forming large batches of the process comprising depositing an elongated windrow on the ground and making a full length groove in the top surface. The activated carbon and perlite dust are then layered in the groove and the nitrogenous material deposited on the activated carbon and perlite dust. The ingredients are mixed under selected moisture and temperature conditions to form the end product.

12 Claims, 1 Drawing Sheet

U.S. Patent
Oct. 22, 1996
5,567,220
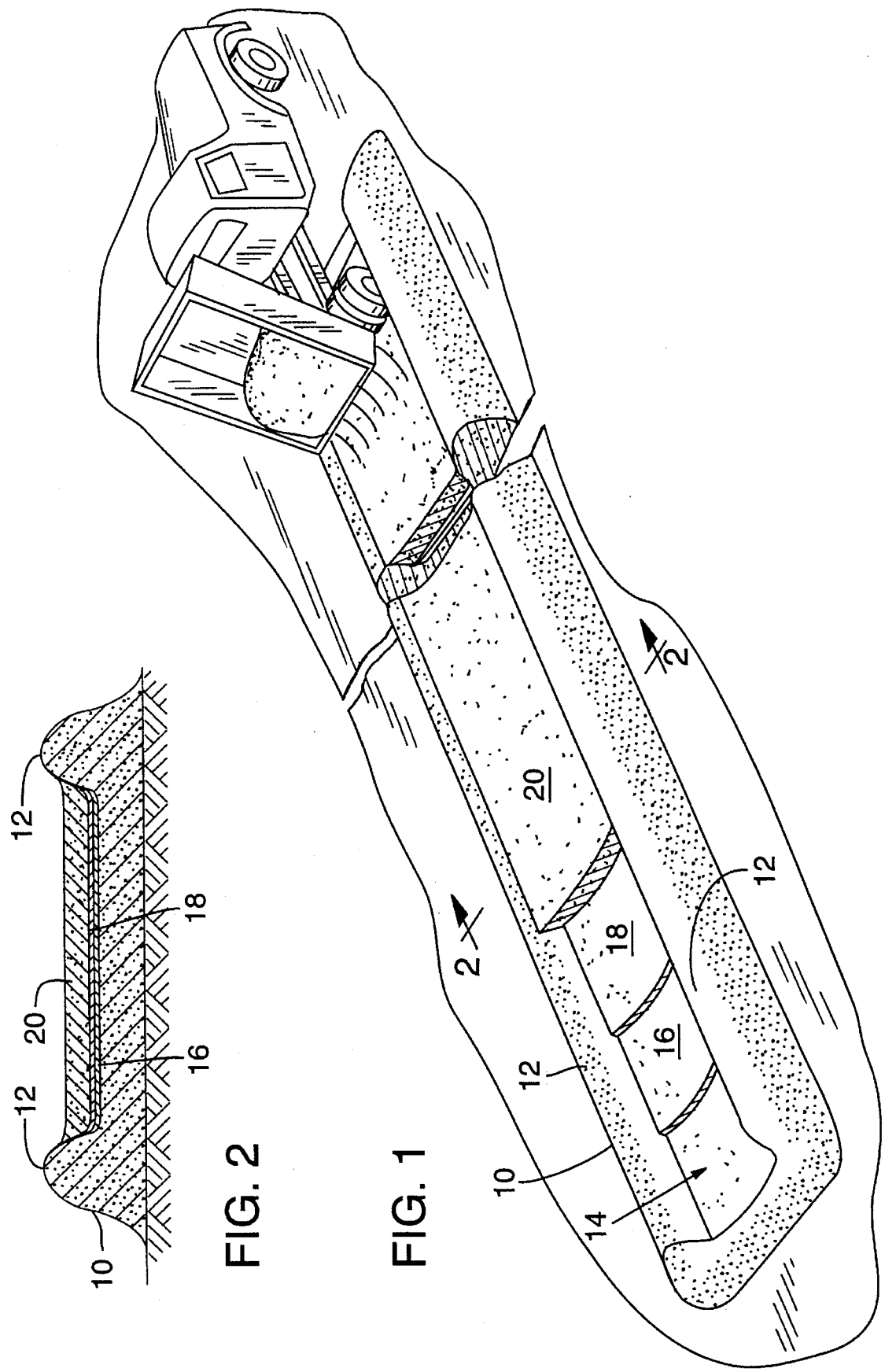

COMBINATION PLANT FOOD SUPPLEMENT AND COMPOST MATERIAL AND PROCESS

BACKGROUND OF THE INVENTION

This invention relates to a combination plant food supplement and compost material and to a process of making the same.

Tons of fish and shell fish scrap are discarded every year. This creates an immense problem of sight, odor and disposal. It has been established that fishwaste composting can be a possible practice in economically disposing of fishwaste from seafood processors. However, problems exist when using fishwaste for composting because mechanisms controlling decomposition thereof and the dynamics of fishwaste compost N in the soil are not fully understood or have not heretofore been determined. Coupled with the lack of knowledge of the benefits of fishwaste as noted, a first disadvantage is present in that the odor of decomposition does not make such use always practical. Also, this type of scrap induces the breeding of fly larva, resulting in a generally unsatisfactory fly problem. Further, a problem exists for making fertilizer from fish scrap in that there is substantial ammonia loss when the fish and shell fish scrap are mixed with other byproducts such as sawdust. This ammonia loss results in the reduction of nitrogen and renders the final product of minimum value as a fertilizer.

As noted in a publication of American Society of Agricultural engineers, 1994, Volume 37 (3) pages 853–856, a process of composting fish scrap and in particular crab scrap has been developed. Such process was developed for small individual crab processors wherein ingredients of the compost are loaded in a wooden bin in alternate layers of crab scraps and pine sawdust. One disadvantage of such process is its unavailability to mass production of compost since layering of the scrap with sawdust in a confined space is impractical. To be practical in areas that dispose of tons of fish and crab scrap every week, mass composting must be available. Another disadvantage of the prior process is that preparation of a compost takes several months which of course limits a fast turnover of the product.

SUMMARY OF THE INVENTION

An object of the invention is to provide a new and improved combination compost material and high quality plant food supplement and that in its formulation includes fish or shell fish scrap and that in a final product is substantially odor free.

A further object of the invention is to provide a product and process of the type described that uses ingredients of industrial waste materials.

A further object is to provide a new and novel process in the formation of the plant food supplement and compost material.

In carrying out the invention, ingredients of the product comprise the following:

A carbonaceous material such as sawdust, paper pulp, or agriculture by-product,
Activated carbon, Perlite dust,
A nitrogenous material, preferably ground fish, fish parts and shell fish.
Water A feature of the invention is that all of its ingredients are capable of sources from industrial waste products. For example, while sawdust has various other uses, it is classified as a waste product of sawmills. Frequently it can be obtained without cost or at least at low cost merely by hauling it away. Sawdust is in good supply. Activated carbon in powder form is also readily available. It can be obtained freely as waste material from heating plants, burners, etc. Perlite dust is fines from the perlite industry, namely, it is in powder form and is generally discarded in the processing of commercial perlite. The fish ingredient is readily available particularly in view of recent stringent rules regarding disposal of garbage. Waste water can also be used since it is available from industrial factories, for example, from commercial food processing plants.

The invention will be better understood and additional objects and advantages will become apparent from the following description taken in connection with the accompanying drawings.

BRIEF DESCRIPTION OF THE DRAWINGS

FIG. 1 is a perspective view of a windrow batch process of the invention.

FIG. 2 is a cross sectional view of the windrow batch process of FIG. 1.

DETAILED DESCRIPTION OF A PREFERRED EMBODIMENT

In carrying out the invention, activated carbon is spread evenly on top of carbonaceous material, such as on the sawdust. Perlite is then spread evenly on top of the activated carbon and the nitrogenous material spread on top of the perlite dust. All ingredients are mixed together and the pile cured for three days. Water is added as needed to maintain a moisture content of 60% to 70%. The pile is cured for 3 days at which time it is turned and cured until its temperature of decomposition reaches at least 131° F. for two days. The moisture is then checked and adjusted to maintain the 60% to 70% moisture content. The pile is then turned and cured for 5 days. The process is repeated as to turning and maintaining the said moisture content until the temperature averages 100° F. The compost material is at this time ready for use. Overall processing time averages approximately three months.

The drawings illustrate a fast, efficient and large process to form a batch of the material. In this process, a large amount of sawdust 10 is laid out in a windrow 12 and a trough 14 is formed centrally through the length of the windrow. The trough extends down to a point short of the bottom. Thereupon as seen in FIG. 2 the activated carbon 16 and the perlite dust 18 are spread on top of the sawdust interiorly of the trough. The fish scrap 20 is then dumped in the trough. All stacking of the windrow and other ingredients as well as turning thereof can be accomplished by machinery. In a representative process, 400 cubic yards of sawdust are used in the windrow that measures approximately 50 yards long, 2 yards high, and 8 yards wide. The trough is approximately 3 yards wide and extends to within one yard from the bottom. 10 cubic yards of activated carbon and 10 cubic yards of perlite dust are laid in the trough and 50,000 pounds of fish scrap dumped on top of the perlite dust.

The windrow is mixed together for aeration in suitable manner such as by power machinery and is then cured for approximately 3 days. The moisture content of the mixture is steadily monitored and water is added as needed to provide the said moisture content of 60% to 70%. Checking and adjusting moisture content is repeated until the pile maintains the said average temperature of approximately 100° F. and completion. The total time as stated consumes approximately three months.

The particular process of conditions and ingredients used has important advantages. That is, as the heat develops after mixture of the carbonaceous material, i.e., the sawdust and the nitrogenous material, i.e., the fish scrap, aerobic thermophilic bacteria multiply in the heat of decomposition and convert the nitrogenous material to a bacterial biomass. The furnace ash and perlite fines in the initial process limit loss of ammonia nitrates, they lock nitrogen into the biomass, and further they limit fly larva, namely, fly larva that are not killed by the high temperature of composting, and odors by the cutting action of the perlite dust and the sulfur that exists in furnace ash. This action further helps to retain water, to break down the very hard, verk slick surfaced sulfur flakes that create the sulphate form of sulfur, and to bind all the materials into a homologous biomass that retains higher amounts of nitrogen and minerals for an improved source of plant food. The 3 foot bed of sawdust and the drying action of the perlite dust prevent moisture of the fish scrap from leeching down through the sawdust to the support surface.

The present process and product is primarily related to fish scrap as the nitrogenous ingredient. The carbonaceous material may vary in its type of ingredient, for example, paper pulp and agriculture by-products can be used. Although the size of the batch may vary, the large windrow type as shown is preferred to provide mass production as well as careful monitoring and controlling of the progress of the mix. Also, the large type of batch allows for easy buildup and mixing by power machinery. It is to be understood that a batch of the product can be prepared without using the full windrow as shown. In such case, the proportions of the partial batch are the same as was illustrated in connection with the full batch.

The product and its particular ingredients as well as the particular process provide a product that is efficient in use as a plant food supplement and compost material. The process is adapted to a large batch process and has a fast curing rate as compared to prior composting procedures. The end product is clean and substantially odorless. Its quality aeration makes it light and fluffy to handle. It is an organic material and provides a slow release plant food. An important function of the product and process also is that every one of its ingredients is available as waste material.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. A process of making a combination plant food supplement and compost material, comprising the steps, conducted at atmospheric temperature and pressure, of
   a) mixing a carbonaceous material with a nitrogenous material to form a bacterial biomass,
   b) including activated carbon and perlite dust in the mixture for limiting the loss of ammonia nitrates as well as to lock nitrogen in the biomass and to limit fly larva and odors,
   c) adding water to the mixture to maintain a moisture content of about 60–70 percent, and
   d) periodically mixing the mixture for a time to bring the temperature of the mixture first to at least about 131° F. and thereafter down to about 100° F.

2. A combination plant food supplement and compost material produced by the process of claim 1.

3. The combination plant food supplement and compost material of claim 2 wherein said carbonaceous material comprises wood sawdust and said nitrogenous material comprises fish scrap.

4. The combination plant food supplement and compost material of claim 3 wherein the ingredients of the product are used in a proportion of 400 cubic yards of carbonaceous material, 10 cubic yards of activated carbon, 10 cubic yards of perlite fines, and 50,000 pounds of fish scrap.

5. The process of claim 1 wherein said carbonaceous material comprises wood sawdust and said nitrogenous material comprises fish scrap.

6. The process of claim 5 wherein the ingredients of the product are used in a proportion of 400 cubic yards of carbonaceous material, 10 cubic yards of activated carbon, 10 cubic yards of perlite fines, and 50,000 pounds of fish scrap.

7. A combination plant food supplement and compost material produced by the process of claim 6.

8. The process of claim 1 wherein said process is performed by spreading the carbonaceous material in an elongated pile, depositing the activated carbon and perlite dust in layers on said pile, and then depositing the nitrogenous material on the activated carbon and perlite dust.

9. The process of claim 1 wherein said process is performed by spreading the carbonaceous material in an elongated pile, depositing the activated carbon and perlite dust in layers on said pile, and turning the pile frequently while maintaining the moisture content of 60% to 70%.

10. The process of claim 1 wherein said process is performed by spreading the carbonaceous material in an elongated pile, depositing the activated carbon and perlite dust in layers on said pile, then depositing the nitrogenous material on the activated carbon and perlite dust, mixing all of the ingredients and water together at a moisture content of 60% to 70%, and curing the pile until the internal temperature reaches approximately 131° F., then turning the pile frequently while maintaining the moisture content of 60% to 70%, and then turning and curing the pile until the pile maintains an average temperature of approximately 100° F.

11. The process of claim 1 wherein said process is performed by spreading the carbonaceous material in an elongated windrow with a full length groove cut in the top thereof, depositing the activated carbon and perlite dust in layers in said groove, and then depositing the nitrogenous material on the activated carbon and perlite dust.

12. The process of claim 11 wherein the groove in said windrow terminates short of the bottom of the windrow wherein to prevent moisture from said nitrogenous material from leeching through to a supporting surface for the carbonaceous material.

* * * * *